United States Patent Office 3,124,606
Patented Mar. 10, 1964

3,124,606
PARA-NITROPHENYL TERTIARY BUTYL CARBONATE
George W. Anderson, Allendale, and Anne C. (McGregor) Belcher, Thornwood, N.J., assignors to American Cyanamid Company, Stamford, Conn., a corporation of Maine
No Drawing. Original application Nov. 13, 1958, Ser. No. 773,563. Divided and this application Dec. 2, 1960, Ser. No. 75,066
1 Claim. (Cl. 260—463)

This invention relates to para-nitrophenyl tertiary butyl carbonate and a method of preparing same.

This application is a division of copending application Serial No. 773,563, filed November 13, 1958, which in turn is a continuation-in-part of copending applications Serial No. 646,983, filed March 19, 1957, now abandoned, and Serial No. 646,982, filed March 19, 1957, now Patent No. 3,095,408.

As elucidated with more particularity in the aforesaid copending applications Serial No. 646,982 and Serial No. 773,563, we have found that the tertiarybutyloxycarbonyl radical

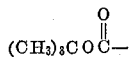

can be used effectively as the amine blocking group in peptide synthesis, and that when it is so used it can be readily removed or cleaved from the amino nitrogen by the action of a hydrogen halide while the peptide moiety is still in the original peptide-forming medium. Tertiary-butyloxycarbonyl derivatives of amino acids or peptides may be prepared by reacting para-nitro phenyl tertiary butyl carbonate

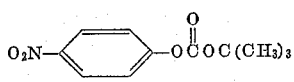

with the desired amino acid or peptide. The aforesaid derivatives, per se, their preparation by the aforesaid process and an uninterrupted sequential peptide synthesis based on their use, are claimed in the above-mentioned copending applications Serial No. 646,982 and Serial No. 773,563.

We have discovered that para-nitrophenyl tertiary butyl carbonate may be prepared by the successive steps of reacting tertiary butanol with p-nitrophenylchloroformate in the presence of a tertiary amine base and then recovering the thus-formed para-nitrophenyl tertiary butyl carbonate therefrom by conventional extraction-evaporation-recrystallization techniques. While pyridine is the preferred tertiary amine base other bases of this type such as quinoline, dimethyl aniline and triethylamine are operable for this purpose.

The above reaction involving the preparation of para-nitrophenyl tertiarybutylcarbonate effectively conducted at temperatures from about 0° C. up to about 90° C. For convenience, however, we have found it best to operate at about room temperatures. In using higher temperatures, i.e., reflux temperatures, the boiling point of the particular tertiary amine base-tertiary butanol mixture used will be the practical limiting factor. For instance, when quinoline is the tertiary amine base used, the highest convenient temperature will be about 86° C. The chloroformate used as a reactant in this process may be prepared by the method outlined in German Patent 287,805.

The following examples are illustrative of the preparation of p-nitrophenyl tertiary butyl carbonate.

Example A

Tertiary butanol (38 g.) was added to 206 ml. dry pyridine. The resulting solution was thoroughly stirred and then cooled to 0° C. after which 103.5 g. p-nitrophenylchloroformate was added slowly in portions to the cooled solution while keeping the reaction temperature below 5° C. After the addition was complete, the mixture was allowed to stir at room temperature for three hours. The reaction temperature rose to 40° C. during the first half hour, and then subsided. Pyridine hydrochloride was removed by filtration, and 250 ml. water was added to the filtrate. The product was extracted into 600 ml. N HCl, 200 ml. saturated sodium carbonate solution, and 200 ml. saturated sodium carbonate solution, and 200 ml. saturated sodium chloride solution. After drying, the crystalline residue was recrystallized from ethanol-water. The product, obtained in 72% yield, had a melting point of 78.5–79.5° C. and the following percentage analysis, C—55.39, H—5.50 and N—5.88 and O (calc. by difference)—33.23. (Calculated percentage analysis: C—55.22, H—5.48, N—5.86 and O—33.44.)

Example B

Tertiary butanol (5.9 g.) was added to 30 ml. of quinoline, whereupon the resulting solution was thoroughly stirred. 16.0 g. of p-nitrophenylchloroformate was added slowly with stirring to the above solution. After the addition of the p-nitrophenylchloroformate was complete, the resulting reaction mixture was stirred for about 2 hours and then filtered to remove quinoline hydrochloride. The desired product p-nitrophenyl tertiary butyl carbonate was recovered from the filtrate by essentially the same means as outlined in Example A.

We claim:
Para-nitrophenyl tertiary butyl carbonate.

References Cited in the file of this patent
UNITED STATES PATENTS
2,791,603    Bavley et al. _____ May 7, 1957

OTHER REFERENCES
Miyaki et al.: Chemical Abstracts 44, 3197a (1950).
Carpenter et al.: J. American Chem. Soc., 74, 3818–3821 (1952).
Carpino: J. Amer. Chem. Soc. 79, 98–101 (1957).